United States Patent
Kloft et al.

[11] Patent Number: 6,159,554
[45] Date of Patent: Dec. 12, 2000

[54] METHOD OF PRODUCING A MOLYBDENUM-STEEL SLIDE SURFACE ON A LIGHT METAL ALLOY

[75] Inventors: Manfred Kloft, Rhode; Reinhard Strich, Braunschweig, both of Germany; Gerhard Barbezat, Glattbrugg, Switzerland

[73] Assignee: Volkswagen AG, Wolfsburg, Germany

[21] Appl. No.: 09/069,564

[22] Filed: Apr. 29, 1998

Related U.S. Application Data

[63] Continuation of application No. PCT/EP96/04745, Oct. 31, 1996.

[30] Foreign Application Priority Data

| Oct. 31, 1995 | [DE] | Germany | 195 40 572 |
| Apr. 6, 1996 | [DE] | Germany | 195 49 403 |
| Jul. 17, 1996 | [DE] | Germany | 196 28 786 |

[51] Int. Cl.$^7$ .................................................. C23C 4/06
[52] U.S. Cl. ............................................. 427/456; 427/455
[58] Field of Search ..................................... 427/455, 456

[56] References Cited

U.S. PATENT DOCUMENTS

| 2,588,422 | 3/1952 | Shepard | 309/3 |
| 3,620,137 | 11/1971 | Prasse | 92/169 |
| 5,032,469 | 7/1991 | Merz et al. | 427/455 |
| 5,080,056 | 1/1992 | Kramer et al. | |
| 5,614,022 | 3/1997 | Vatavuk et al. | 427/456 |

FOREIGN PATENT DOCUMENTS

| 2433814 | 1/1976 | Germany . |
| 4440713 | 5/1995 | Germany . |
| 53-41621 | 4/1978 | Japan . |
| 59-93865 | 5/1984 | Japan . |
| 1767010 | 10/1992 | Russian Federation . |
| 1478287 | 6/1977 | United Kingdom . |
| 2050434 | 1/1981 | United Kingdom . |

OTHER PUBLICATIONS

Steel in the U.S.S.R.; vol. 17, No. 3, 1987, London, pp. 148–150, XP002025365; "Structure and Properties of Arc Sprayed, Steel–Molybdenum Coatings" by Levchenko et a.; (See p. 5). (no month date).

*Primary Examiner*—Katherine A. Bareford
*Attorney, Agent, or Firm*—Baker Botts L.L.P.

[57] ABSTRACT

A method for producing cylinder linings in an aluminum alloy engine block for an internal combustion engine utilizes plasma spraying of a mixture of powdered molybdenum and powdered steel containing from about 10 to about 70 wt. % molybdenum and from about 90 to about 30 wt. % steel directly to the engine block. The resulting slide layer has good adhesion to the engine block and has high wear resistance.

34 Claims, 5 Drawing Sheets

6,159,554

METHOD OF PRODUCING A MOLYBDENUM-STEEL SLIDE SURFACE ON A LIGHT METAL ALLOY

REFERENCE TO RELATED APPLICATION

This application is a continuation of Application No. PCT/EP96/04745 with an international filing date of Oct. 31, 1996.

BACKGROUND OF THE INVENTION

This invention relates to methods for producing a slide surface on a light metal alloy and also to reciprocating piston engines such as internal combustion engines having cylinder linings with slide surfaces.

German Offenlegungsschrift No. 44 40 713 discloses a method of producing slide surfaces on cast iron parts consisting of several steps in which lubrication pockets are exposed in a slide surface so as to provide hydrodynamic lubrication in operation. These steps include machining of the slide surfaces and then processing the surfaces with a chemically and electrochemically inactive liquid applied under a pressure suitable for flake removal. By a combination of liquid erosion and frictional smoothing the lubrication pockets are exposed in the slide surface, forming in the aggregate a system of pressure microchambers to provide the requisite hydrodynamic lubrication. These pockets are produced by a honing operation which extracts small titanium carbide and nitride particles from the surface and the craters so formed are closed by further treatment. Liquid erosion and frictional smoothing expose these pockets again.

U.S. Pat. No. 5,080,056 discloses a process in which a substantially pore-free aluminum bronze alloy layer is applied by high velocity flame spraying to parts made of a an aluminum alloy, the thickness of the applied alloy layer being then reduced by honing from about 1 mm to a final dimension of about 127 microns.

In contradistinction to the formation of a system of pressure microchambers, it is known that a communicating groove system may be obtained, for example on the surfaces of cylinder liners for internal combustion engines by a honing operation. Such honing produces intersecting scores which are interconnected at the points of intersection and constitute an overall open system. A disadvantage of this system is that the part sliding on the slide surface, for example a piston ring on a piston of an internal combustion engine, will push oil contained in the scores ahead of it, preventing any significant build-up of hydrodynamic oil pressure on the slide surface. Consequently, along the edges of the scores there will be mixed friction between the two materials. The mixed friction lubrication systems which are in widespread use for surfaces of gray iron castings, however, are not applicable to slide surfaces on parts made of an aluminum alloy for reasons of weight.

U.S. Pat. No. 2,588,422 discloses an aluminum engine block having cylinder liners which are formed by thermal spraying. These liners are built up in two layers on the untreated surface of the engine block, the top layer being a hard slide layer such as steel about 1 mm in thickness and the lower layer being a molybdenous interlayer about 50 microns in thickness. The interlayer, containing at least 60% molybdenum, does not constitute a slide layer, but is necessary in order to bind the hard slide layer to the aluminum block. Preferably, the interlayer is made up of pure molybdenum. The slide layer is a layer of hard metal, as for example carbon steel, bronze or stainless steel, in which the steel may be an alloy containing nickel, chromium, vanadium or molybdenum for example. In principle, this two-layer structure provides a good slide layer, but the cost of the double coating is substantial.

British Published Patent Application No. 2,050,434 discloses various coatings obtained by thermal spraying and having thicknesses from 0.5 to 2 mm. These coatings are formed on steel or cast parts for internal combustion engines, as for example piston rings or cylinder linings. In this case it is found that coatings consisting of equal parts of powdered molybdenum and powdered carbon steel are considerably less abrasion-resistant than coatings containing only 0.5–4.5 wt. % of molybdenum with 20–97 wt. % of metal carbides and possibly iron or ferrous alloys. To bind these coatings to aluminum alloys, the process described above with respect to U.S. Pat. No. 2,588,422 must be used.

British Patent No. 1,478,287 describes a powdered mixture for plasma coating of steel parts or castings such as piston rings, cylinder blocks or cylinder linings to produce layers having a thickness of about 762–1270 microns. The powder is a mixture of molybdenum, boron and cast iron containing at least as much cast iron as molybdenum and the boron is usually present in amounts up to 3% of the sum of molybdenum and cast iron. Such coatings, as example 1 of British Published Patent Application No. 2,050,434A shows, no longer meet present-day performance requirements.

Another coating for cylinder liners is disclosed in U.S. Pat. No. 3,620,137 in which a plasma coating containing nickel and chromium, boron, silicon and possibly also iron in addition to at least 65 wt. % molybdenum is described. This coating is intended for cylinder liners made of gray cast iron and exhibits very small pores of 0.1 to 2 microns and an over-all porosity of 15%, corresponding to the coatings described in British Application No. 2,050,434 and British Patent No. 1,478,287.

SUMMARY OF THE INVENTION

Accordingly, it is an object of the present invention to provide a method for producing a slide surface on a light metal alloy which overcomes disadvantages of the prior art.

Another object of the invention is to provide a method of producing a slide surface on an aluminum alloy in which a single coating operation is sufficient.

A further object of the invention is to provide a reciprocating piston engine having an engine block made of an aluminum alloy with improved slide surfaces.

These and other objects of the inventors attained in a comparatively simple manner by applying a wear layer to a metal part, by thermal spraying as described for example in German Standard DIN 32530, October 1989, and thereafter machining the surface of the part to expose a microchamber system providing lubrication pockets. In this way, a slide surface is produced on a metal part which has a high wear resistance not provided by the base material. The thermal spraying and ensuing machining produce numerous eruptions in the surface of the material which are healed only slightly during the machining, consequently providing an adequate number of depressions to form the microchamber system.

The pressure microchamber system on the slide surface is thus formed in an entirely different manner from the aforementioned prior art which necessarily relies upon the presence of titanium components.

In a preferred embodiment of the invention, the wear layer is applied by plasma spraying, in particular atmospheric plasma sprayings. Plasma-sprayed layers are in themselves microporous to begin with so that, using such layers, a single processing operation, for example honing, can produce a system of pressure microchambers in the coating surface.

The high-velocity flame spraying proposed in U.S. Pat. No. 5,080,056 cannot be used in many cases, for example in the production of cylinder liners for internal combustion engines, because the comparatively high energy input could cause the cylinder liners to warp.

The method according to the invention advantageously avoids any environmentally contaminating galvanic step. By use of suitable metal powders for plasma spraying and suitable honing procedures, extremely smooth slide surfaces can be created with extremely low roughness depths, producing the desired pressure microchamber system for hydrodynamic lubrication.

According to the present invention, it has been found that a mixture of powdered steel with powdered molybdenum is especially suitable for thermal spraying to obtain slide surfaces on aluminum alloys. This mixture preferably consists of about 10–70 wt. % powdered molybdenum and about 90–30 wt. % powdered steel, with about 30–50 wt. % powdered molybdenum and about 70–50 wt. % powdered steel being especially preferred. If desired, the mixture may be supplemented with additional components, preferably constituting less than 50 wt. % of the total mixture. One of the most favorable mixtures has been found to be a 50:50 mixture of steel and molybdenum powders. Even though such mixtures coated on cast iron substrates in the prior art lead only to moderately hard, i.e. not wear-resistant, coatings, as described in British Patent No. 2,050,434, such a coating is extraordinarily adherent to light metal alloys, and is extraordinarily tight and abrasion resistant when coated on aluminum. Thus, according to the invention, the slide surface is formed on a layer deposited directly on the aluminum alloy, requiring no interlayer as is necessary according to U.S. Pat. No. 2,588,422. Thus, a unique feature of the present invention is that a wear-resistant layer can be applied with direct bonding to the comparatively soft substrate of an aluminum. Another improvement provided by the invention is the coating of cylinders in aluminum engine blocks of a reciprocating piston engine to produce wear-resistant slide surfaces using the method.

In thermal spraying of coating layers according to the invention, a plasma spray is preferably employed, and the mixture of metal to be sprayed is preferably in the form of a powder. Since the powder sprayed onto the surface of the part is at least incipiently molten during spraying, maintenance of a certain particle size distribution is advantageous to the quality of the resulting coating. The use of particles having a size between about 2 and 70 microns, and preferably between about 5 and 50 microns, is especially advantageous. Preferably about 90 percent of the particles should have a size satisfying the foregoing requirements.

For use in preparing slide coatings according to the present invention, certain steels have proved especially advantageous. A number of properties of the steel, separately or combined, lead to especially favorable slide coatings. Among these special properties is the hardness of the steel for which various criteria may be critical. Thus, the hardness of the annealed steel, of the thermally sprayed steel, or else the hardness of the sprayed molybdenum-steel mixture, may be taken as criterion. For the mixtures, another consideration as a criterion for the steel selection is the hardness distribution throughout the mixture. Typical parameters for the hardness of the steel are as follows:

The thermally sprayed steel has a hardness from about 300 to about 500 HV 0.3, preferably about 350 to about 450 HV 0.3;

The steel (annealed) before thermal spraying has a hardness from about 300 to about 450 HV 0.3;

The steel has a hardness selected so that a thermally sprayed mixture of 30 wt. % molybdenum or molybdenum alloy with up to about 40 wt. % of other constituents and 70 wt. % of the steel has a hardness from about 550 to about 850 HV 0.05, preferably from about 600 to about 750 HV 0.05, desirably from about 650 to about 700 HV 0.05;

The steel has a hardness selected so that a thermally sprayed mixture of 50 wt. % molybdenum or molybdenum alloy with up to 40 wt. % of other constituents and 50 wt. % of the steel has a hardness from about 550 to about 850 HV 0.05, preferably from about 600 to about 750 HV 0.05, desirably from about 650 to about 700 HV 0.05;

The steel has a hardness selected so that thermally sprayed mixtures in the range 5 from 30 wt. % molybdenum or molybdenum alloy with up to 40 wt. % of other constituents/70 wt. % of the steel to 50 wt. % molybdenum or molybdenum alloy with up to 40 wt. % of other constituents/50 wt. % of the steel have a hardness in the range from about 550 to about 850 HV 0.05, preferably from about 600 to about 750 HV 0.05, and desirably from about 650 to about 700 HV 0.05 a hardness difference of at most 100 HV 0.05, preferably not more than about 80 HV 0.05 and desirably not more than about 50 HV 0.05, and/or at most a 10% higher hardness HV 0.05 than the softest mixture in that range and/or a hardness HV 0.05 differing by at most ±10%, preferably at most ±8% and desirably at most ±5% compared to the mixture of 30 wt. % molybdenum or molybdenum alloy with up to 40 wt. % of other constituents/70 wt. % of the steel.

With the hardness criteria set forth above, very good adhesion to the substrate (in particular an aluminum alloy) and good workability are achieved in addition to low porosity. If the steel is too hard, the danger of layer eruptions increases. If the steel is too soft, it will smear during machining.

Other advantageous criteria for production of a coating according to the invention are the application parameters and the substrate to which the coating is applied. Thus, according to the invention, it has been found that with molybdenum-steel mixtures, thin layers, i.e. those from 80 to 350 microns and preferably 100 to 300 microns, are especially suitable. In the above-mentioned prior art, the corresponding coatings are considerably thicker, i.e. in particular 500 microns to 2.5 mm, coatings on the order of 1000 microns being conventionally formed for cylinder linings. With the use of molybdenum-steel, however, it has been found according to the invention that the thick coatings not only are uneconomical but also have other important disadvantages. Thus, coatings over 350 microns thick readily break away from the substrate, especially when an aluminum alloy is used as the substrate. The use of thinner layers also is not very suitable, since they interfere with the subsequent mechanical treatment, i.e. honing.

Pretreatment of the substrate surface to be coated is especially advantageous, roughening preferably being achieved not by grinding but by application of a particle or fluid stream. Roughening of the surface prior to plasma coating is known in principle, but, for coatings containing molybdenum, as described for example in U.S. Pat. No. 2,588,422, there has heretofore expressly been no roughening but at most a cleaning of the surface. According to the invention, however, it has been found that a very good surface adhesion of the molybdenum-steel layer is not achieved without the special roughening process. Especially advantageous in this case is the use of corundum for roughening, which provides very good long-term results in comparison with aluminum oxide.

Furthermore, it has been found according to the invention that only certain definite mean roughness indexes are suitable and provide layers with especially good adhesion. Thus it has been found that mean rugosities from about 4 to about 35 microns, preferably about 5 to about 25 microns and especially about 5 to about 15 microns, are especially suitable for molybdenum-steel coatings. Only moderate layer adhesion is obtained with lower rugosities and an unfavorable coating surface results from higher rugosities.

Other advantageous spray parameters according to the invention are the porosity and the oxide content of the coating, the production of predominantly closed isolated pores and an advantageous range of pore diameters. According to U.S. Pat. No. 3,620,137 porosities ranging from practically pore-free to about 15% are possible and porosities of about 15% have been obtained by spraying molybdenous coatings on gray castings. According to the invention, however, it has been ascertained that when using such high porosities, layer separation may occur upon subsequent honing especially on aluminum substrates. On the other hand, it is also of no advantage to produce a porosity-free coating. A porosity of at least about 0.3 vol. % and not more than about 10 vol. %, preferably not more than 7 vol. % has proved advantageous to build up a pressure microchamber system on the slide surface. In principle, it is also advantageous if the pores are predominantly closed, i.e., isolated, rather than connected to each other, and lie within a definite size range for example, from about 2 microns to about 40 microns, preferably about 3 microns to about 20 microns. This requirement also differentiates the invention from the disclosure of U.S. Pat. No. 3,620,137 in which the pores are open so as to communicate with each other because of their high volume ratio and the majority of the pores have sizes in a range from 0.1 to 2 microns. Such pores have been found to be not very suitable for the construction of a pressure microchamber system with molybdenum-steel coatings according to the invention.

Last of all, steels satisfying at least one of the following requirements for the chemical compositions of the steel used in applying molybdenum-steel coatings to aluminum have proved favorable:

| C content | 0.7–2.1 wt. %, | esp. 0.8 to 1.5 wt. % |
|---|---|---|
| Cr content | 1.0–15 wt. %, | esp. 1.0 to 5 wt. % |
| Si content | 0.5–2 wt. %, | |
| Mo content | 2.5–50 wt. %, | esp. 3 to 15 wt. % |
| W content | 2.5–30 wt. %, | esp. 3 to 15 wt. % |
| Mo + W content | 2.5–50 wt. %, | esp. 3 to 25 wt. % |

α-Fe matrix at least 50 wt. %, especially at least 70 wt. % of Fe and/or fine Cr, Mo, W and/or Mn carbides (not over 1 micron) in the α-Fe matrix.

According to the invention, cast iron is not well suited, i.e. iron-carbon alloys with a carbon content from 2 to 4 percent. Better suited are steels with less than 2. 1%, which are forgeable.

In principle, coatings of steel in combination with molybdenum are known in the British Published Application No. 2,050,434, but in that case such a mixture produces very poor results on iron substrates. Surprisingly, coatings having such steels are especially advantageous on aluminum alloys. Further, the steels employed according to the invention have a chromium content which is advantageously not above 15%. However, a minimal chromium content is especially favorable, since it achieves a suitable hardness of the steel for spraying together with molybdenum. The chromium content is limited essentially by the formation of austenite, which renders the steel less suitable for use according to the invention. The use of silicon is also favorable according to the invention but small amounts are sufficient. Silicon lowers the melting point of the steel advantageously, so that it can be plasma sprayed especially well together with the molybdenum. However, silicon values above about 2 wt. % lead to embrittlement of the steel. The use of molybdenum as an alloy constituent of the steel, as well as the use of tungsten, is favorable, the upper limit being determined essentially by the resulting increase in the hardness of the steel and the cost of the alloy constituent. Basically, these elements are contained as alloy constituents in a definite percentage. Also according to the invention, a steel having an α-Fe matrix in which fine carbides are contained in the submicroscopic range is advantageous. Such steels are especially suitable for spraying with molybdenum. Preferably, in addition to carbon, the steel used in the coating contains at least one and desirably at least two of the following elements in order of preference: Cr, Si, Mo, W, Mn and B.

Certain alloy constituents are preferably not present or present only in small amounts in the steel, for example, boron up to 1 wt. %, nickel up to 0.5 wt. %, desirably up to 0.3 wt. %, manganese up to 4 wt. % and phosphorus up to 0.5 wt. %, desirably up to 0.2 wt. % and sulfur up to 0.5 wt. %, desirably up to 0.2 wt. %. Manganese is a suitable carbide stabilizer and boron a carbide former as well, while boron in larger amounts leads to a hardening and embrittlement of the steel. Nevertheless, small amounts may be appropriate to lower the melting point of the steel. Nickel as a ductile material, is preferably not present at all, even though, in principle, nickel is regarded as a favorable alloy constituent in steel. The content of phosphorus and sulfur also is preferably kept low to avoid embrittlement of the steel.

In accordance with the invention, slide layers may be bound with special strength to the walls of cylinder bores in a light metal engine block of an internal combustion engine and in an environmentally sound manner. The body to be coated can be an aluminum alloy. The body to be coated can be an AlSi alloy. These slide layers may be applied in one coating step and require only a little further treatment such as honing and no galvanic or environmentally questionable processes are employed.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
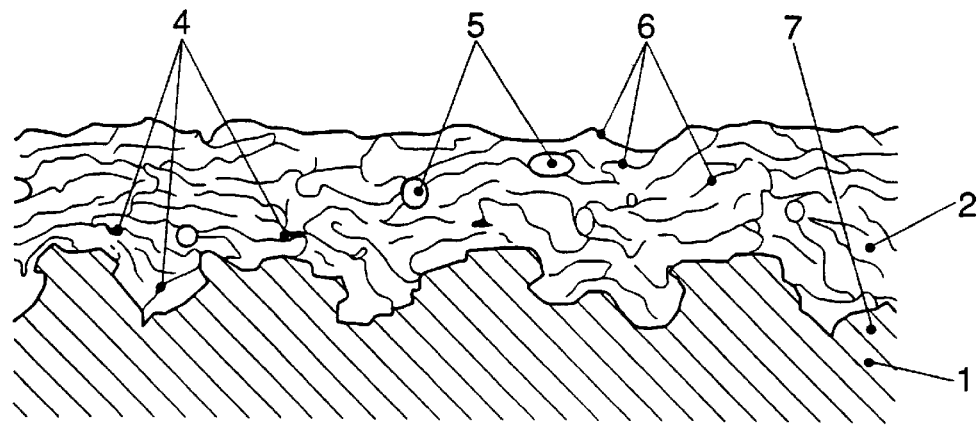
FIG. 1 is a magnified cross-sectional view showing schematically the structure of a representative embodiment of a plasma spray layer applied to a light metal alloy.

The magnified cross-sectional view of FIG. 1 shows a portion of a metal part 1 on which a slide surface 2 affording hydrodynamic lubrication is to be produced, in particular a cylinder liner for a cylinder in the engine block of an internal combustion engine. The engine block 1 is produced from a light metal material such as $AlSi_6Cu_4$, in this instance by pressure casting.

To produce a slide layer suitable to the operating conditions of the cylinder liners, a wear layer 3 is applied to the part 1 by plasma spraying.

FIG. 1 shows the applied wear layer 3 on the part 1 at high magnification and schematically. As shown in FIG. 1, the wear layer 3 is bound to the part 1 by mechanical interlocking which is produced because the wear layer in the liquid state penetrates the unevenness and undercuts in the surface of the part. In these places positive geometrical connections are formed upon solidification of the wear layer. In addition, shrink stresses build up inside the wear layer 3, leading to positive forced engagement between the wear layer 3 and the surface irregularities of the Part 1.

The wear layer 3 contains inclusions such as impurities 4 and unmelted spray particles 5 and also has comparatively thin oxide layers 6.

The spray powders used to produce the wear layer 3 contain a certain volume percentage of a molybdenum powder while the remainder is composed of a powdered steel. The powdered steel may, for example, consist of iron, molybdenum, chromium, nickel, silicon and boron which, when combined, provide a very hard steel powder. Alternatively, a tool steel alloy consisting or iron, molybdenum, tungsten and chromium may be employed or a low alloy steel, based for example on iron, chromium, manganese and carbon, may be used.

The wear layer may be made by spraying a powder consisting of 20–60% by weight of powdered molybdenum with the balance powdered steel. Especially good results have been obtained using 30–50% of powdered molybdenum and 70–50% of a tool steel alloy powder. A possible optimum, depending among other things on the honing and the depth of the roughness to be produced, is a 50%—50% powder combination.

After solidification of the wear layer 3, machining in the form of honing, as disclosed for example in German Offenlegungsschrift No. 44 40 713, reduces the wear layer 3 to a desired final thickness. Advantageously, in this honing operation, the remnants of inclusions such as individual solidified metal droplets, exposed by abrasion, will be extracted from the surface, exposing numerous lubrication pockets 7 in the form of minute isolated cavities as shown in FIG. 3.

Advantageously, the totality of these isolated lubrication pockets 7 forms a pressure microchamber system on the slide surface 2 with plateaus 8 of extremely small rugosity separating the lubrication pockets 7. No further steps, such as the use of fluid jets to expose lubrication pockets healed by machining as in the prior art, are required to produce the microchamber system.

Figure 3:
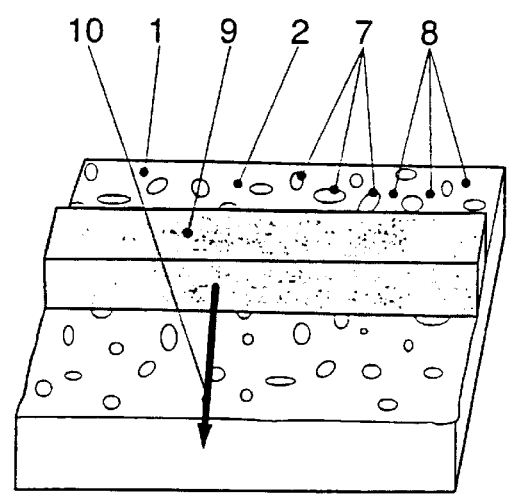
FIG. 3 is a schematic perspective view similar to FIG. 2 illustrating a representative embodiment of a slide surface having pressure microchamber system according to the invention.

FIG. 3 shows a portion of a cylinder lining of a part 1 having a slide surface 2 and a pressure microchamber system formed by lubrication pockets 7 separated by plateaus 8. Schematically, a piston ring segment 9 is shown engaging the slide surface 2 and moving relative to the slide surface 2 with a direction of motion 10 as in operation of the engine. The lubricant collected in the separated lubrication pockets 7 provides a hydrodynamic lubrication by flotation of the piston ring segment 9.

Figure 2:
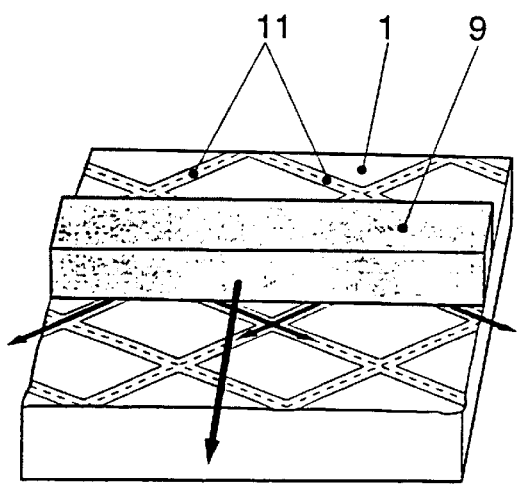
FIG. 2 is a perspective view illustrating schematically a slide surface having a communicating system with limited hydrodynamic lubrication according to the prior art.

In contrast to the slide surface having a microchamber system with isolated pockets as shown in FIG. 3, FIG. 2 shows a slide surface with an open, communicating groove system according to the prior art. In this surface intersecting scores 11, produced by honing, contain lubricant which is merely pushed along ahead of the piston ring in the direction of the arrows by the motion of the piston ring segment 9. With this system, no hydrodynamic pressure can be built up and, at the edges of the scores 11, mixed friction between the piston ring and the cylinder lining is possible.

With suitable adjustment of the process parameters, in particular of the composition of the wear layer 3 and of the material removed by honing, it is possible to produce a pressure microchamber system affording hydrodynamic lubrication by the method of the invention in a comparatively few and simple steps. The composition of the wear layer has a direct relation to the hardness of the resulting slide surface and the removal of particles by honing may, for example, be increased by increasing the proportion of powdered molybdenum.

The specific rate of removal by honing, that is, the ratio of measured removal during honing to the time required therefor, was found to be high enough in the case of all sprayed layers to permit completion of the honing operation within preassigned time cycles for the fabrication of an engine block having lined cylinders.

For the molybdenum component, a molybdenum essentially as described in U.S. Pat. No. 2,588,422, i.e. a molybdenum alloy with up to about 40% other constituents, may be used. Preferably, however, a molybdenum is used which has at least 90% by weight of molybdenum and, in particular, a molybdenum having other constituents which do not individually exceed 1% is preferred, the molybdenum content preferably being above 95%. The molybdenum may, for example, have an angular shape.

The steel preferably has a spherical morphology, such as is obtained by nozzle spraying. As the steel component, preferably an alloy steel such as alloy 101, with about 4% Cr, 5% Mo, 1% Si, 0.9% C and 6% W and the balance Fe is employed, rather than a high-alloy steel such as alloy 102 a very low alloy steel such as alloy 103. The high-alloy steel 102 contains about 5% Cr, over 2.1% C, 2% Si, 30% Mo and 0.5% B, while the low-alloy steel 103 contains about 1.5% Cr, 1.1% C and 1.3% Mn.

Figure 4:
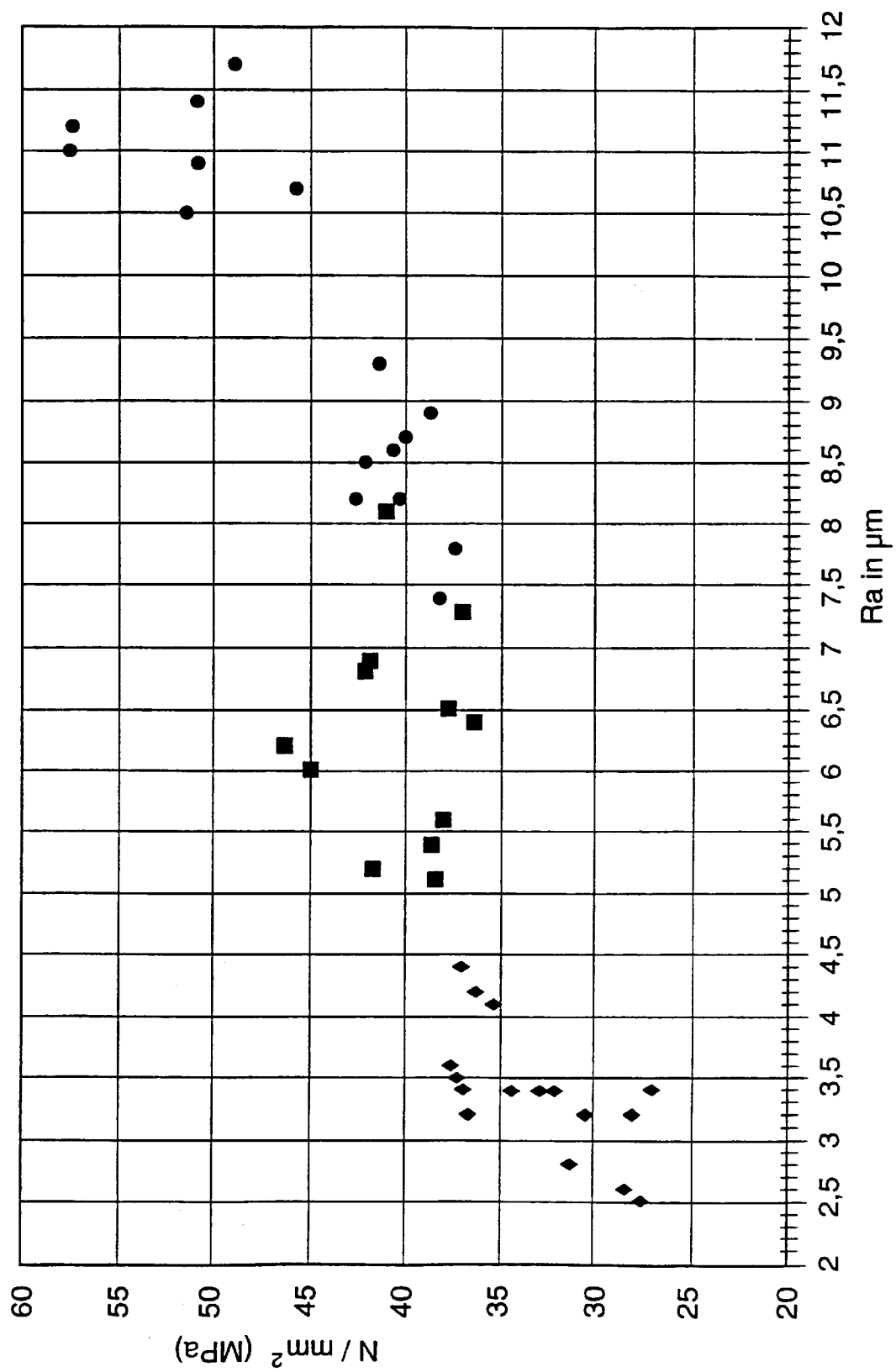
FIG. 4 is a chart showing the adhesion strength of a plasma layer as function of mean rugosity.

With the especially suitable steel alloy 101, the influence of the mean rugosity Ra on the adhesion strength of the coating was tested, using a 50/50 mixture with molybdenum at least 98% pure. The result is illustrated in FIG. 4, which shows that, above a rugosity Ra of at least 4 microns, especially high adhesion strength of the coating on the aluminum substrate is obtained, whereas below that value, there is a broad scatter towards lower adhesion strengths.

Figure 5:
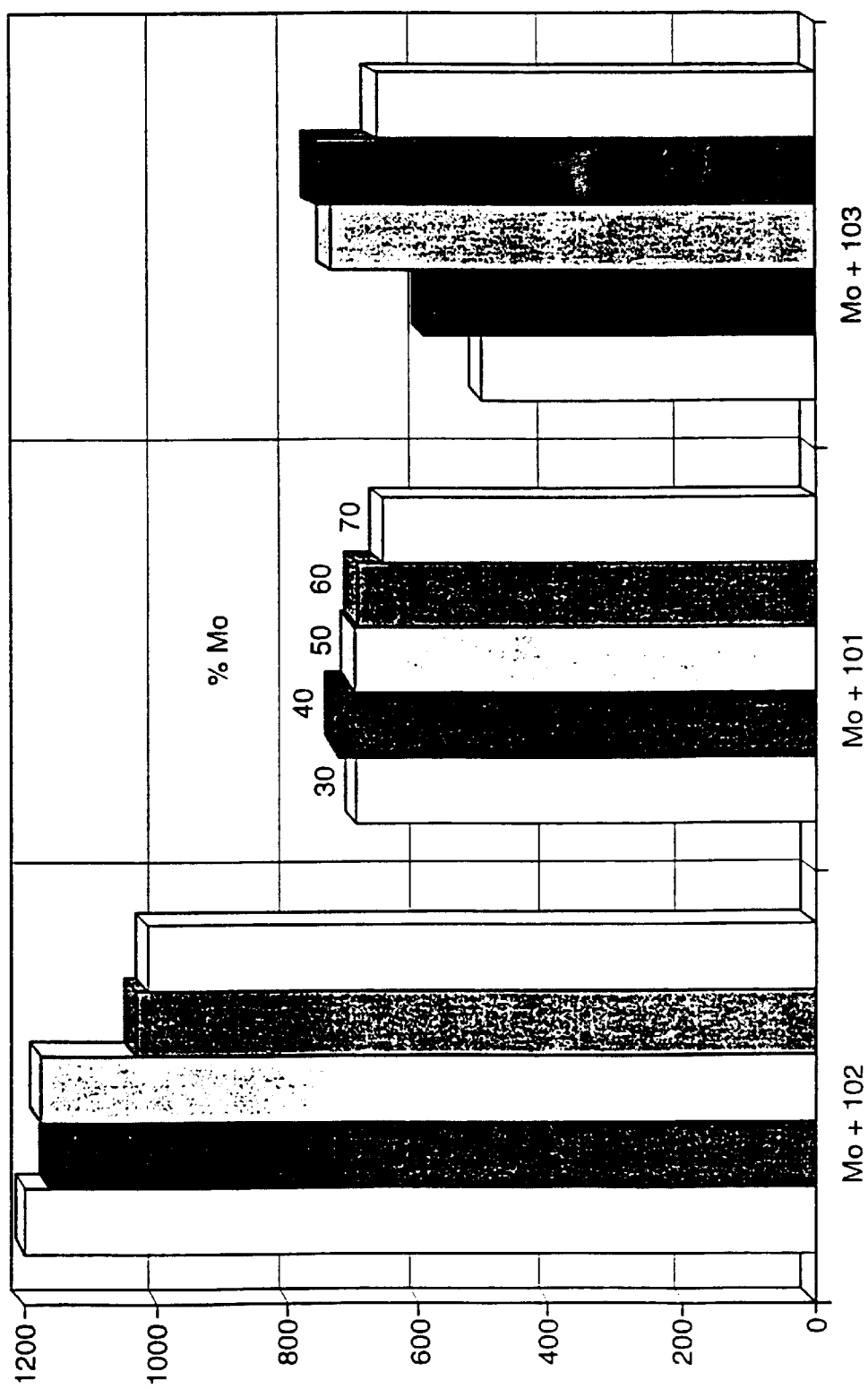
FIG. 5 is a bar graph showing layer hardness as a function of composition.

Next, comparative hardness measurements were carried out, the hardness tests being performed directly on the honed spray layer surfaces with a test load of HV 0.05 using the Vickers small load hardness test. The test surfaces were subjected to the load for 10 seconds in each instance. Plateaus of adequate size were sought for the test, so that the results would not be falsified by pores. Because of the low test load, the hardnesses are only of comparative significance, since a DIN Standard measurement of hardness would not be possible because of the porosity and extreme thinness of the layer. For each surface tested, 5 single measurements were performed, and their mean was calculated. It may be seen in FIG. 5 that the Mo-steel 102 plasma spray layers were the hardest and great fluctuations in hardness appeared with increasing molybdenum content. It turned out that, with the best steel according to the invention, alloy 101, only slight fluctuations in hardness are obtained, whereas with the low alloy steel 103, the lowest hardnesses are obtained, again with marked fluctuations of hardness as a function of the proportion of molybdenum. Steels having a low hardness variation as a function of molybdenum content in the spray power are the best suited for coating cylinder linings in aluminum engine blocks. In addition, coatings in an intermediate hardness range, about HV 0.05, are especially suitable.

Figure 6:
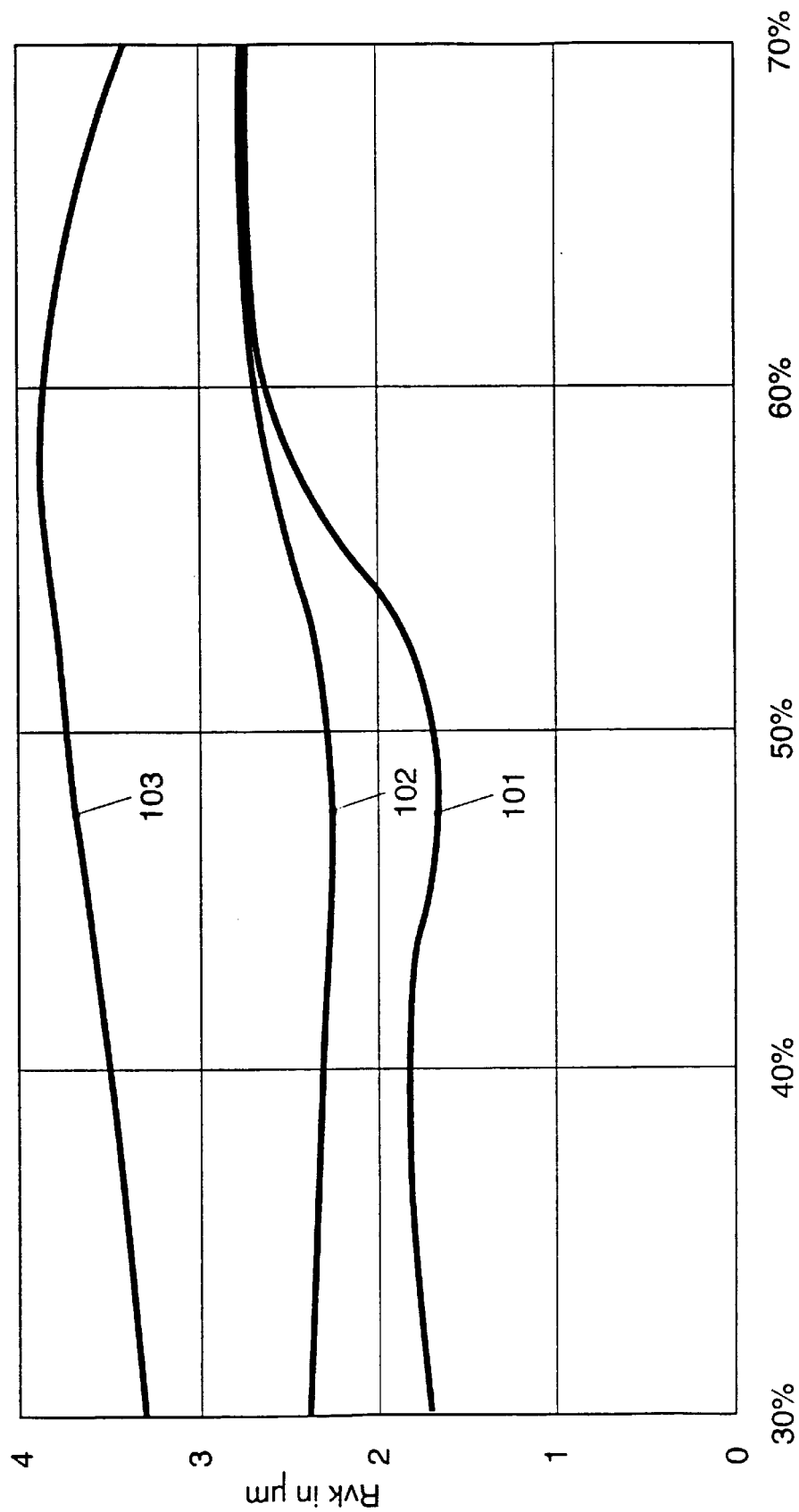
FIG. 6 is a graphical illustration showing reduction in score depth with respect to molybdenum content.
Figure 7:
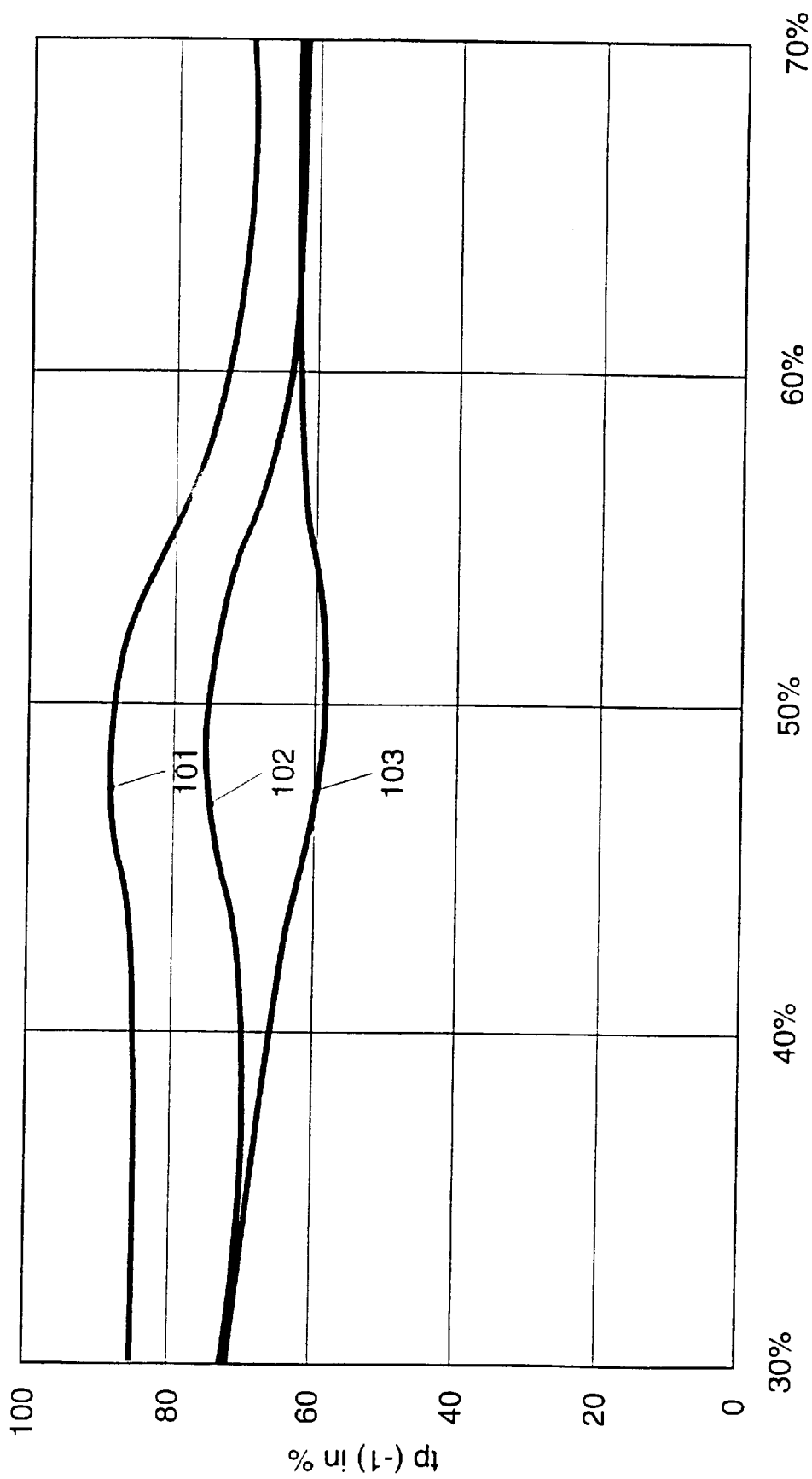
FIG. 7 is a graphical illustration showing the bearing ratio at 1 micron depth with respect to molybdenum content.

The honed plasma spray layers were also tested for their rugosity profiles, from which conclusions concerning honability and suitability for use in internal combustion engines may be drawn. By way of example, the reduced scoring depth (Rvk) and the bearing ratios $tp^{-1}$% against molybdenum content are reproduced in FIGS. 6 and 7, respectively. The roughness measurements were performed with a Perthometer S8P 5.6. For each of three internally coated cylinders, three measurements were taken. Especially favorable values of reduced score depth are at one to two microns, which are attained without difficulty with the 101 steel. The bearing ratios serve to support the piston and the piston rings, and should be as large as possible. Here again, the best measurements were obtained with the 101 steel.

Although the invention has been described herein with reference to specific embodiments, many modifications and variations therein will readily occur to those skilled in the art. Accordingly, all such variations and modifications are included within the intended scope of the invention.

We claim:

1. A method for producing a slide surface on a body comprising thermal spraying a powder mixture of (a) 10 to 70 wt. % molybdenum or molybdenum alloy with up to about 40 wt. % of other constituents, (b) 90 to 30 wt. % of a steel having an α-Fe matrix of at least 50 wt. % and/or from 0.8 to 2.1 wt. % carbon and/or from 1.0 to 15 wt. % chromium, (c) and from 0 to 50 wt. % of one or more other components on the body to form a coating providing a slide surface on the body, wherein the steel is selected from the group consisting of: a steel having a hardness from 300 to 500 HV 0.3 after thermal spraying; a steel (annealed) having a hardness from 300 to 450 HV 0.3 before thermal spraying; a steel having a hardness selected so that a thermally sprayed mixture of 30 wt. % molybdenum or molybdenum alloy with up to about 40 wt. % of other constituents and 70 wt. % of the steel has a hardness from 550 to 850 HV 0.05; a steel having a hardness selected so that a thermally sprayed mixture of 50 wt. % molybdenum or molybdenum alloy with up to about 40 wt. % of other constituents and 50 wt. % of the steel has a hardness from 550 to 850 HV 0.05; and a steel having a hardness selected so that thermally sprayed mixtures in the range from about 30 wt. % molybdenum or molybdenum alloy with up to about 40 wt. % of other constituents/70 wt. % of the steel to about 50 wt. % molybdenum or molybdenum alloy with up to about 40 wt. % of other constituents/50 wt. % of the steel have a hardness difference selected from the group consisting of: (i) at most 100 HV 0.05, (ii) at most a 10% higher hardness HV 0.05 than the softest mixture in that range and (iii) a hardness HV 0.05 differing by at most ±10% compared to a mixture of 30 wt. % molybdenum or molybdenum alloy with up to about 40 wt. % of other constituents/70 wt. % of the steel.

2. A method according to claim 1, wherein the hardness of the sprayed steel is in the range from about 350 to about 450 HV 0.3.

3. A method according to claim 1 wherein the hardness of a thermally sprayed mixture of 30 wt. % molybdenum or molybdenum alloy with up to about 40 wt. % of other constituents/70 wt. % steel is in the range from about 600 to about 750 HV 0.05.

4. A method according to claim 3 wherein the hardness of a thermally sprayed mixture of 30 wt. % molybdenum or molybdenum alloy with up to about 40 wt. % of other constituents/70 wt. % steel is in the range from about 650 to about 700 HV 0.05.

5. A method according to claim 1 wherein the hardness of a thermally sprayed mixture of 50 wt. % molybdenum or molybdenum alloy with up to about 40 wt. % of other constituents/50 wt. % steel is in the range from about 600 to 750 HV 0.05.

6. A method according to claim 5 wherein the hardness of a thermally sprayed mixture of 50 wt. % molybdenum or molybdenum alloy with up to about 40 wt. % of other constituents/50 wt. % steel is in the range from about 650 to 700 HV 0.05.

7. A method according to claim 1 wherein the steel has a hardness such that thermally sprayed mixtures in the range from 30 wt. % molybdenum or molybdenum alloy with up to about 40 wt. % of other constituents/70 wt. % of the steel to 50 wt. % molybdenum or molybdenum alloy with up to about 40 wt. % of other constituents/50 wt. % of the steel have a hardness in the hardness range from about 550 to about 850 HV 0.05.

8. A method according to claim 7 wherein the hardness of the steel is such that the thermally sprayed mixtures have a hardness in the range from about 600 to about 750 HV 0.05.

9. A method according to claim 8 wherein the hardness of the steel is such that the thermally sprayed mixtures have a hardness in the range from about 650 to about 700 HV 0.05.

10. A method according to claim 1 wherein thermally sprayed mixtures in the range from 30 wt. % molybdenum or molybdenum alloy with up to about 40 wt. % of other constituents/70 wt. % of the steel to 60 wt. % molybdenum or molybdenum alloy with up to about 40 wt. % of other constituents/40 wt. % of the steel satisfies one of the specified hardness difference requirements.

11. A method according to claim 1 wherein thermally sprayed mixtures in the range from about 30 wt. % molybdenum or molybdenum alloy with up to about 40 wt. % of other constituents/70 wt. % of the steel to about 50 wt. % molybdenum or molybdenum alloy with up to about 40 wt. % of other constituents/50 wt. % of the steel have a hardness difference of not more than about 80 HV 0.05.

12. A method according to claim 11 wherein the thermally sprayed mixtures have a hardness difference of not more than about 50 HV 0.05.

13. A method according to claim 1 wherein thermally sprayed mixtures in the range from about 30 wt. % molybdenum or molybdenum alloy with up to about 40 wt. % of other constituents/70 wt. % of the steel to about 50 wt. % molybdenum or molybdenum alloy with up to about 40 wt. % of other constituents/50 wt. % of the steel have at most an 8% higher hardness HV 0.05 than the softest mixture in that range.

14. A method according to claim 13 wherein thermally sprayed mixtures in the range from about 30 wt. % molybdenum or molybdenum alloy with up to about 40 wt. % of other constituents/70 wt. % of the steel to about 50 wt. % molybdenum or molybdenum alloy with up to about 40 wt. % of other constituents/50 wt. % of the steel have at most a 5% higher hardness HV 0.05 than the softest mixture in that range.

15. A method according to claim 1 wherein thermally sprayed mixtures in the range from about 30 wt. % molybdenum or molybdenum alloy with up to about 40 wt. % of other constituents/70 wt. % of the steel to about 50 wt. % molybdenum or molybdenum alloy with up to about 40 wt. % of other constituents/50 wt. % of the steel have a hardness HV 0.05 deviating by at most ±5% referred with regard to that of the mixture of 30 wt. % molybdenum or molybdenum alloy with up to about 40 wt. % of other constituents /70 wt. % of the steel.

16. A method according to claim 1 wherein the body to which the coating is applied is an aluminum alloy.

17. A method according to claim 16 wherein the body is an AlSi alloy.

18. A method according to claim 1 wherein the steel satisfies at least one requirement selected from the group consisting of:

| | |
|---|---|
| C content | 0.7–2.1 wt. %; |
| Cr content | 1.0–15 wt. %; |
| Si content | 0.5–2 wt. %; |
| Mo content | 2.6–50 wt. %; |
| W content | 2.5–30 wt. %; |
| Mo + W content | 2.5–50 wt. %; |

α-Fe matrix at least 50 wt. % of Fe;

fine Cr, Mo, W and/or Mn carbides (not over 1 micron) in an α-Fe matrix;

| | |
|---|---|
| B content | up to 1 wt. %; |
| Ni content | up to 0.5 wt. %; |
| Mn content | up to 4 wt. %; |
| P content | up to 0.5 wt. %; and |
| S content | up to 0.5 wt. %. |

19. A method according to claim 18 wherein the steel satisfies at least one 2 requirement from the group consisting of:

| | |
|---|---|
| C content | 0.8 to 1.5 wt. %; |
| Cr content | 1.0 to 5; |
| Mo content | 3 to 15; |
| W content | 3 to 15; |
| Mo + W content | 3 to 25; |

α-Fe matrix at least 70 wt. % of Fe;

| | |
|---|---|
| Ni content | up to 0.3 wt. %; |
| P content | up to 0.2 wt. %; and |
| S content | up to 0.2 wt. %. |

20. A method according to claim 1 wherein the steel also satisfies at least one requirement selected from the group consisting of:

| | |
|---|---|
| B content | up to 1 wt. %; |
| Ni content | up to 0.5 wt. %; |
| Mn content | up to 4 wt. %; |
| P content | up to 0.5 wt. %; and |
| S content | up to 0.5 wt. %. |

21. A method according to claim 20 wherein the steel also satisfies at least one requirement selected from the group consisting of:

| | |
|---|---|
| Ni content | up to 0.3 wt. %; |
| P content | up to 0.2 wt. %; and |
| S content | up to 0.2 wt. %. |

22. A method according to claim 1 wherein the body is a cylinder lining surface of an internal combustion engine.

23. A method according to claim 1 wherein the body is an aluminum engine block.

24. A method according to claim 1 including removing part of the coating by a mechanical process.

25. A method according to claim 1 wherein the application of the mixture to form a coating satisfies at least one of the requirements selected from the group consisting of:

a coating thickness from 80 to 350 microns;

the coating is applied to a surface of the body which has been roughened by a flow of a stream of particles and/or fluid;

the coating is applied to a surface having a mean rugosity (Ra) from about 4 to about 35 microns;

the coating has a porosity of not more than about 10 vol. %;

the coating has predominantly isolated pores; and the coating has a majority of pores in a size range from about 2 to about 40 microns.

26. A method for producing a slide surface on a body comprising thermal spraying a powder mixture of (a) 10 to 70 wt. % molybdenum or molybdenum alloy with up to about 40 wt. % of other constituents and (b) 90 to 30 wt. % of a steel and (c) from 0 to 50 wt. % of one or more other components to form a coating providing a slide surface on the body, wherein the coating is applied so as to satisfy at least one characteristic selected from the group consisting of:

to provide a coating with a thickness from 80 to 350 microns;

application to a surface having a mean rugosity (Ra) in the range from about 4 to about 35 microns;

to provide a coating with a porosity not more than about 10 vol. %;

to provide a coating with predominantly isolated pores;

to provide a coating with a majority of the pores in a size range from about 2 to about 40 microns.

27. A method according to claim 25 or claim 26 wherein the thickness of the layer is 100 to 300 microns.

28. A method according to claim 25 or claim 26 wherein the porosity of the coating is no more than about 7 vol. %.

29. A method according to claim 25 or claim 26 wherein the majority of the pores size in the range from about 3 to about 20 microns.

30. A method according to claim 25 or claim 26 wherein the surface of the body is pretreated with corundum to roughen the surface.

31. A method according to claim 25 or claim 26 wherein the surface of the body has a mean rugosity (Ra) in the range from about 5 to about 25 microns.

32. A method according to claim 31 wherein the surface of the body has a mean rugosity (Ra) in the range from about 5 to about 15 microns.

33. A method for producing a slide surface on an aluminum alloy comprising thermal spraying a powder mixture of (a) 10 to 70 wt. % molybdenum or molybdenum alloy with up to about 40 wt. % of other constituents and (b) 90 to 30 wt. % of a steel to form a coating having a slide surface on the aluminum alloy wherein the steel satisfies at least one requirement selected from the group consisting of:

| | |
|---|---|
| C content | 0.7–2.1 wt. %; |
| Cr content | 1.0–15 wt. %; |
| Si content | 0.5–2 wt. %; |
| Mo content | 2.5–50 wt. %; |
| W content | 2.5–30 wt. %; |
| Mo + W content | 2.5–50 wt. %; |

$\alpha$-Fe matrix at least 50 wt. %; and fine Cr, Mo, W and/or Mn carbides (not over 1 micron) in an $\alpha$-Fe matrix.

34. A method according to claim 33 wherein the steel satisfies at least one requirement selected from the group consisting of:

| | |
|---|---|
| C content | 0.8 to 1.5 wt. %; |
| Cr content | 1.0 to 5; |
| Mo content | 3 to 15; |
| W content | 3 to 15; |
| Mo + W content | 3 to 25; and |

$\alpha$-Fe matrix at least 70 wt. % of Fe.

* * * * *